United States Patent

Ishigaki

[15] 3,647,082
[45] Mar. 7, 1972

[54] FILTER PRESS
[72] Inventor: Eiichi Ishigaki, Sakaide, Japan
[73] Assignee: Ishigaki Kiko Co., Ltd., Tokyo, Japan
[22] Filed: Oct. 22, 1969
[21] Appl. No.: 868,362

[30] Foreign Application Priority Data
Nov. 2, 1968 Japan...................................43/80143

[52] U.S. Cl..........................................................210/225
[51] Int. Cl........................................................B01d 25/32
[58] Field of Search ..........100/198, 218; 210/230, 224–229,
210/231, 236, 445, 455, 374, 359

[56] References Cited

UNITED STATES PATENTS

| | | | |
|---|---|---|---|
| 626,646 | 6/1899 | Baggett | 100/198 X |
| 2,849,121 | 8/1958 | Burwell | 210/230 X |
| 3,306,445 | 2/1967 | Mozlek | 210/230 X |
| 3,366,243 | 6/1968 | Kurita | 210/230 X |
| 3,486,624 | 12/1969 | Sykes | 210/236 X |

OTHER PUBLICATIONS

Japanese Patent Publication, Dec. 23, 1964, No. 39- 29934

*Primary Examiner*—Reuben Friedman
*Assistant Examiner*—T. A. Granger
*Attorney*—Olson, Trexler, Wolters & Bushnell

[57] ABSTRACT

A filter press which includes a plurality of separated filter frames and filter plates maintained in juxtaposed assembly. Means are provided which permit the withdrawal of said filter frames out of the clearances space between the filter plates in such a manner that the filter frames are maintained in parallel arrangement. Removal of the cakes formed during filtration from the filter frames is effected by discharging means which are advanced and retreated through the openings of the frames. A filter medium is employed in the form of an endless belt entrained over said plates, said medium being run and washed continuously when cakes in the filter frames are removed.

9 Claims, 25 Drawing Figures

FILTER PRESS

BACKGROUND OF INVENTION

This invention relates to a novel and improved filter press, and more particularly to a filter press which facilitates the speedy and efficient removal of cakes from filter frames, while providing for washing of the filter medium.

A filter press of the type in which filter frames and filter plates are arranged alternatively, a filter medium is positioned between each filter frame and filter plate adjacent to the frame, liquid to be purified is fed into each filter frame through an inlet of said frame, and filtrate passed through the filter medium is withdrawn from under a supporting bed. Each filter plate includes an outlet positioned at the lower portion thereof so that filtration can be performed under a high pressure, the content of water in the cakes maintained at a minimum and a large, effective filtering area is provided, notwithstanding the smaller area taken up by the filtering bed. Owing to the above-mentioned advantages, said type of filter press has been widely used in numerous industries, such as the chemical industry, the dye industry, the paint industry and in the mining industry. Also, these presses are used in removing water from slurries such as that precipitated at a water-cleaning plant, or slurry from a sewer. The filter presses according to the prior art have certain defects, the most important one of which consists in the fact that cleaning of the filter is very time consuming. That is, when such a cleaning is required, it is necessary to separate the filter frames and filter plates, to discharge cakes out of the filter frames, to exchange or to wash the filter medium, and to assemble the filter frames and filter plates again, all of which requires a considerable amount of time, wherein the filter is not in operation. Further, in filter presses according to the prior art, the discharging of cakes out of the filter frames is difficult, exchanging filter mediums is very troublesome, and washing the filter medium with the same remaining in the filter is impossible, so that prior to the present invention, the perfect automation of operation including filtering itself and cleaning of the filter had been deem impossible.

Accordingly, it is a primary object of the present invention to provide an improved filter press which avoids the above-mentioned defects and in which the discharging cakes out of filter frames is done rapidly and with considerable ease and wherein the washing of the filter medium with some remaining in the filter press is possible so that the time for cleaning the filter is shortened. Accordingly, the overall operation including filtering itself and cleaning of the filter can be performed according to a predetermined program whereby a perfect automation of the operation becomes possible.

According to the present invention, this object is accomplished by providing in a filter press, connecting means for a plurality of filter frames and filter plates therebetween which means give a definite interval between each filter frame and each filter plate adjacent to the frame in the separated state of the filter frames and the filter plates, means for assembling and separating the filter frames and the filter plates, means for withdrawing the filter frames out of the clearances between the filter plates, cake-discharging means which are advanced and retreated through the openings of the filter frames whereby cakes choked in the openings of the frames are removed, a filter medium in the form of an endless belt which covers the surface of each filter plate and which is run by suitable driving means when washing is intended, and means for washing the filter medium as it is advanced.

The present invention and its advantages will become more readily apparent as the specification is considered in conjunction with the accompanying drawings in which.

DESCRIPTION OF THE ILLUSTRATED EMBODIMENTS

Referring now to the drawings, in which like reference numerals designate like parts throughout the several views thereof, there is shown a preferred embodiment of the filter press according to the present invention in FIG. 1 through FIG. 15. The filter press includes a pair of parallel guiding bars 2 which are secured to press frame 1 at their ends. As is usual, a plurality of filter frames 3 and filter plates 4 are arranged alternatively between a fixed head 5, which is fixed to the frame 1 and includes a surface which confronts the plates 4 and is similar thereto, and a movable head 6 which is advanced along the bars 2. Each filter plate 4 is slidably mounted on the bars 2 by means of arms 7 at both sides (see FIG. 3) and all of the filter plates 4 are connected with upper links 8 and lower links 9 having elongate apertures so that each interval between two adjacent filter plates 4 is a definite one at the assembled state of the filter press shown In FIG. 1 and the other definite one at the separated state of the filter press shown in FIG. 2. Each filter frame 3 is slidably mounted on two rails 10 and is connected with two adjacent plates 4 by means of the lower link 9 so that the intervals between two adjacent filter frames 3 in the assembled state shown in FIG. 1 and the separated state shown in FIG. 2 are definite, respectively.

The connecting mechanisms between the filter frames 3 and filter plates 4 are shown in great details in FIGS. 9, 10, 11 and 12. Each upper link 8 which connects the upper portions of two adjacent filter plates 4 is pivotally connected to one filter plate with a pin 11 on the plate and is loosely connected to the other filter plate with a pin 11 on the plate inserted into the long aperture 12 of the link 8 having a definite length whereby each filter plate 4 can be moved forwardly and backwardly along the bars 2 by distance $\alpha$. Each lower link 9 is pivotally connected at its center with the filter plate 4 by means of a pin 13 secured onto the filter plate 4 and is connected at its ends with the adjacent two links 9 by means of pins 15 inserted into the long apertures 14 having a definite length ½$\alpha$, respectively. To each pin 15 is secured a guide member 17 with an aperture 16 through which a guiding bar 18 is loosely inserted and each filter frame 3 is connected with two adjacent filter plates 4 through said guiding bars 18 so that the filter frame 3 can be moved forwardly and backwardly along the bars 2 by a distance ½$\alpha$. The guiding bars 18 are vertically mounted between upper brackets 19 and lower brackets 20 which are extended outwardly from the side ends of the filter frame 3 (see FIG. 3). When the links 9 are moved, the filter frames 3 also move along the bars 2 through the connection afforded by guide members 17. The filter frames 3 can be adjusted upwardly and downwardly to the extent allowed by the guide members 17, and the length of each guiding bar 18 is so determined that the filter frames 3 are in parallel arrangement between the filter plates 4 in the taken-up state of the frames and are positioned wholly out of the clearances between the filter plates 4 in the taken-down state of the frames.

Figure 6:
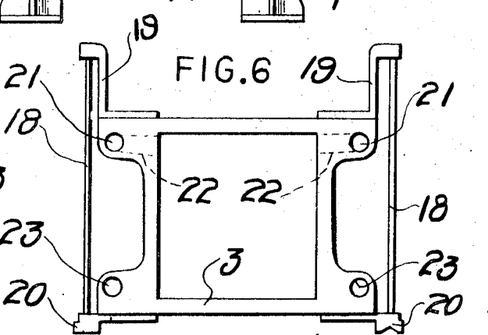
FIG. 6 is a front elevational view of the filter frame shown in FIG. 5.
Figures 7, 8:
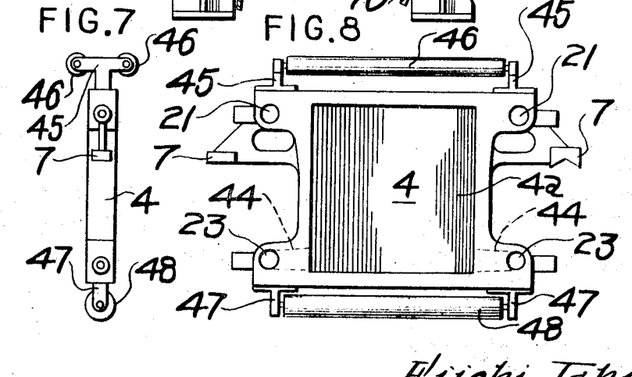
FIG. 7 is a side elevational view of a filter plate.
FIG. 8 is a front elevational view of the filter plate shown in FIG. 7.
Figure 9:
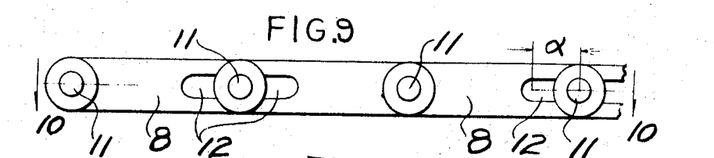
FIG. 9 is a front elevational view of a part of upper member of connecting means for the filter frames and the filter plates.
Figure 10:
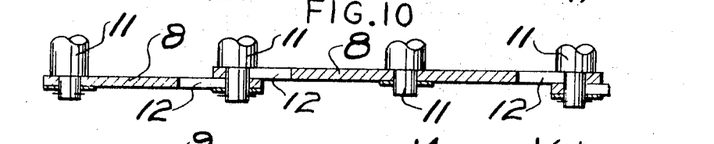
FIG. 10 is a transverse sectional view taken along line 10—10 of FIG. 9.
Figure 11:
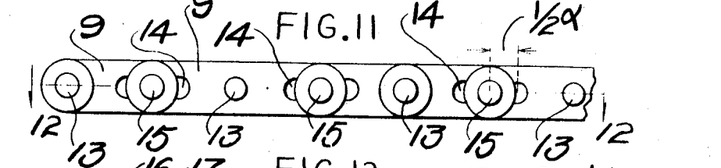
FIG. 11 is a front elevational view of lower member of the connecting means.
Figure 12:
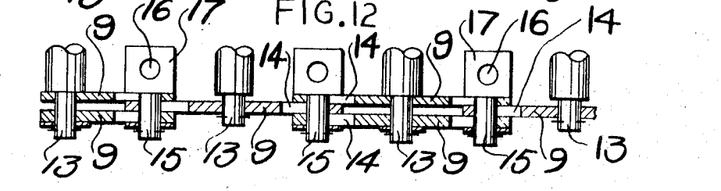
FIG. 12 is a transverse sectional view taken along line 12—12 of FIG. 11.

As is usual, each filter frame 3 is provided with at the upper portion a passage 21 for slurry or water for washing out cakes and a liquid inlet 22 opening into the frame 3 and at the lower portion an outlet 23 for filtrate and water for washing out cakes, as clearly shown in FIG. 6.

Each interval between each filter frame 3 and filter plate 4 can be closed and opened by moving the movable head 6 forwardly and backwardly along the bars 2 with the piston rod 25 of a hydraulic motor 24, or the like. When the interval between each filter frame 3 and filter plate 4 is opened, said interval is so opened that its distance becomes ½$\alpha$ owing to the connection of the frame 3 and the plate 4 with the links 8 and 9 as detailed before.

The rails 10 which determine the upper and lower positions of the filter frames 3, and support said frames 3 at said each position, are provided with apertures into which vertical guiding rods 26 are secured to the frame 1 at both sides of the frames 3 are loosely inserted. Thus, the rails 10 are free to move upwardly and downwardly together with the filter frames 3 on the rods 26 while maintaining a horizontal and parallel arrangement.

Figure 1:
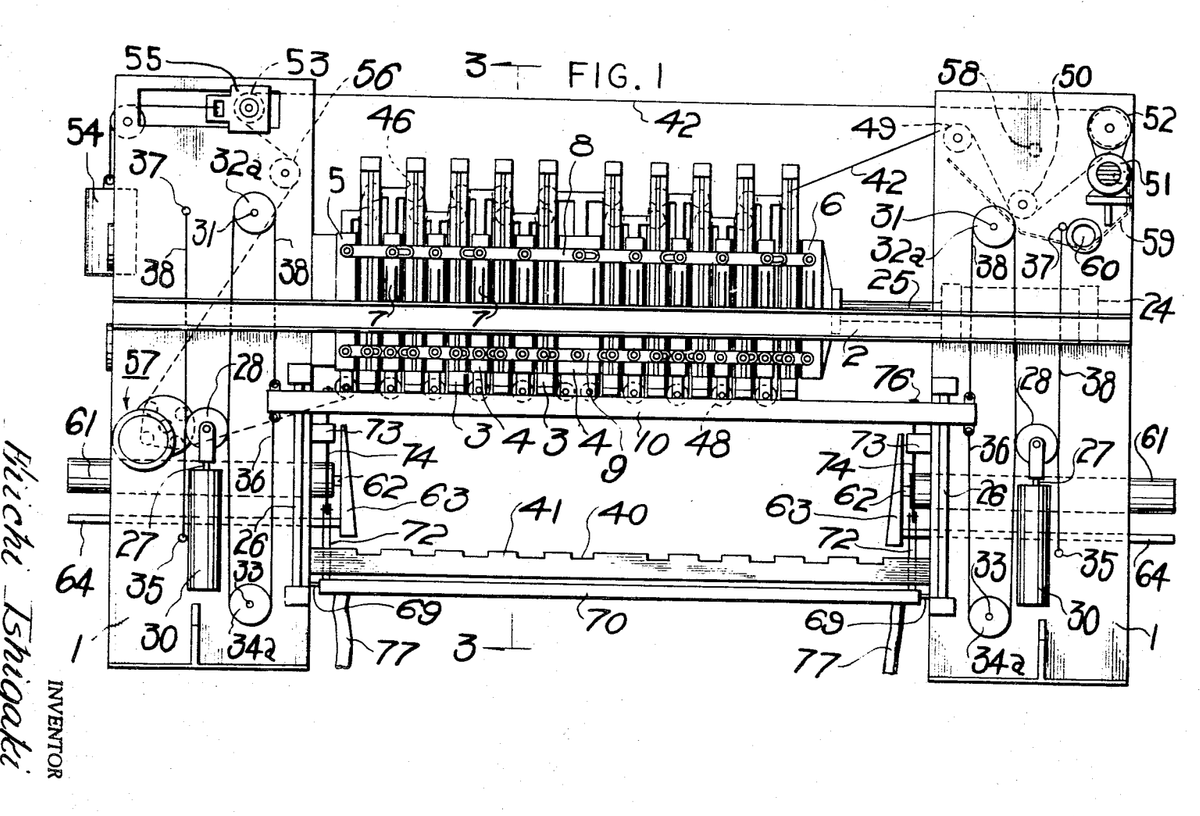
FIG. 1 is a side elevational view of one embodiment of the filter press in the assembled state according to the present invention.
Figure 2:
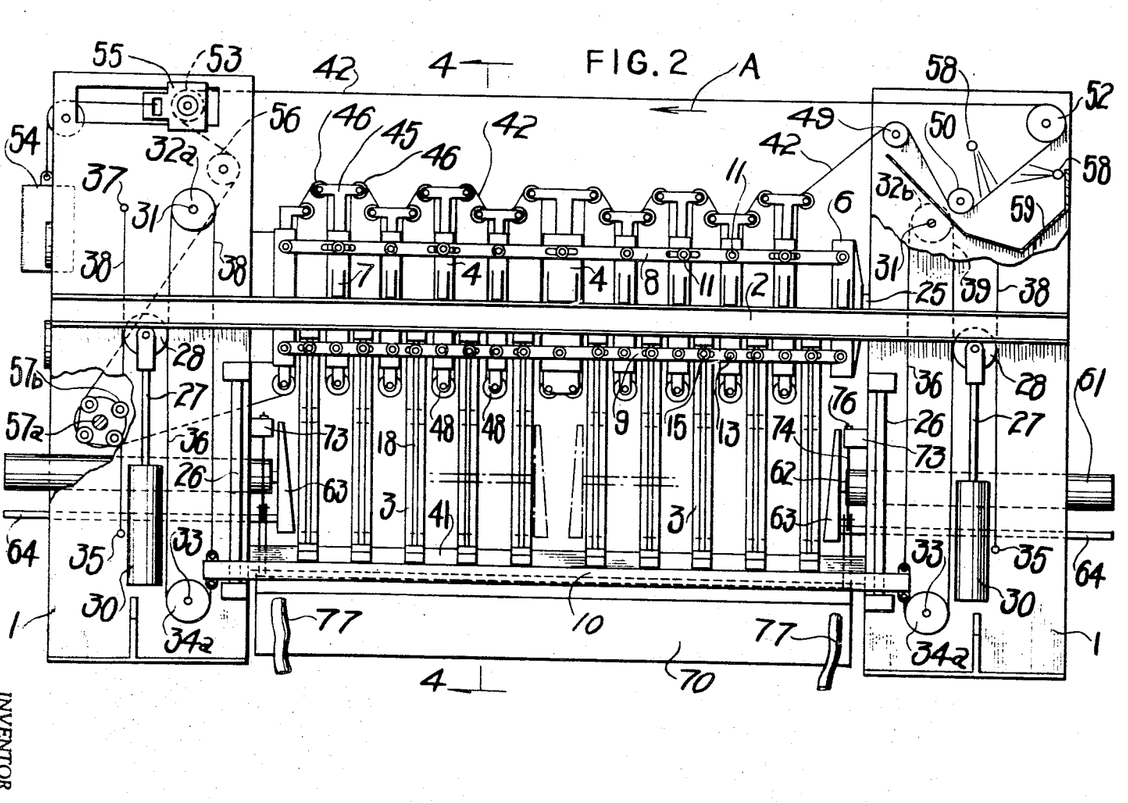
FIG. 2 is a side elevational view, partially cut away, of the filter press shown in FIG. 1 showing the state after the filter frames and the filter plates are separated and the former are lowered out of the clearances between the filter plates.
Figure 15:
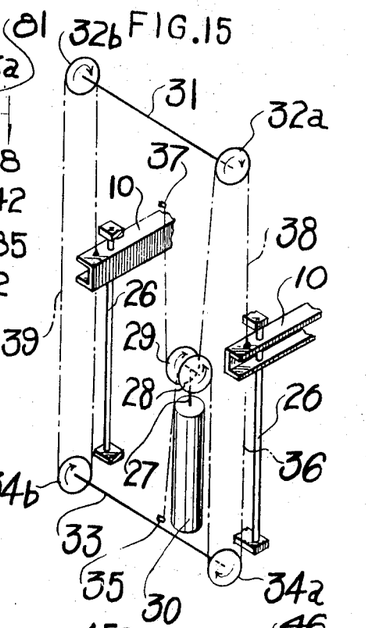
FIG. 15 is a schematic illustration of the means for raising the lowering the filter frames shown with isometric proportion.

Driving means for moving the rails 10 upwardly and downwardly can best be viewed in FIG. 15, and comprise; a hydraulic motor 30, or the like, at the free end of the piston rod 27 on which are rotatably mounted two sprockets 28 and 29; a pair of sprocket wheels 32$a$ and 32$b$ which are rotatably mounted on an upper shaft 31 secured to the frame 1; a pair of sprocket wheels 34$a$ and 34$b$ which are secured on a lower shaft 33 at both side ends of said shaft which is journaled to frame 1; a chain 36 which is fixed to one of rails 10 at one end and is trained over the sprocket wheel 34$a$ and sprocket 28 and the other end of which is fixed to the frame 1 at a lower portion, designated 35; a chain 38 which is fixed to the aforementioned rail 10 at one end and is trained over the sprocket wheel 32$a$ and sprocket 29 and the other end of which is fixed to the frame 1 at an upper portion, designated 37; and a chain 39 which is trained over the sprocket wheels 32$b$ and 34$b$ and is fixed to the other rail 10 at both ends of the chain, as shown in FIGS. 1, 2 and 15. The rails 10 are moved upwardly and downwardly by operation of the motor 30 to extend and retract the piston rod 27; the filter frames 3 on said rails 10 moving therewith.

The filter frames 3 are moved downwardly when the filter frames 3 and the filter plates 4 have been separated to give definite interval ½$\alpha$ therebetween. At the lower portion of the apparatus, there is positioned, between the frames 1, a retaining member 41 which has hollows 40 that receive the lower ends of the filter frames 3 to hold them in position.

Figure 3:
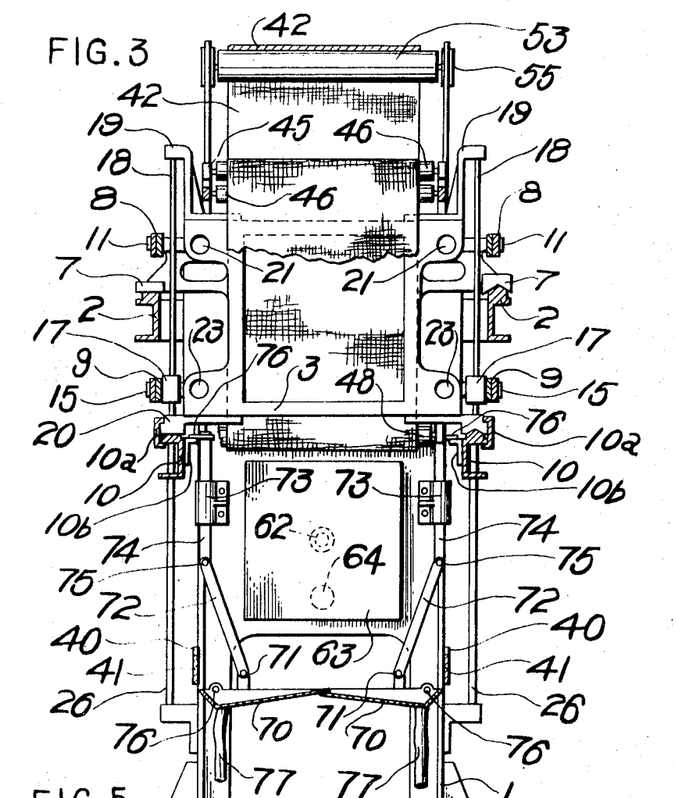
FIG. 3 is a vertical sectional view taken along line 3—3 of FIG. 1.
Figure 4:
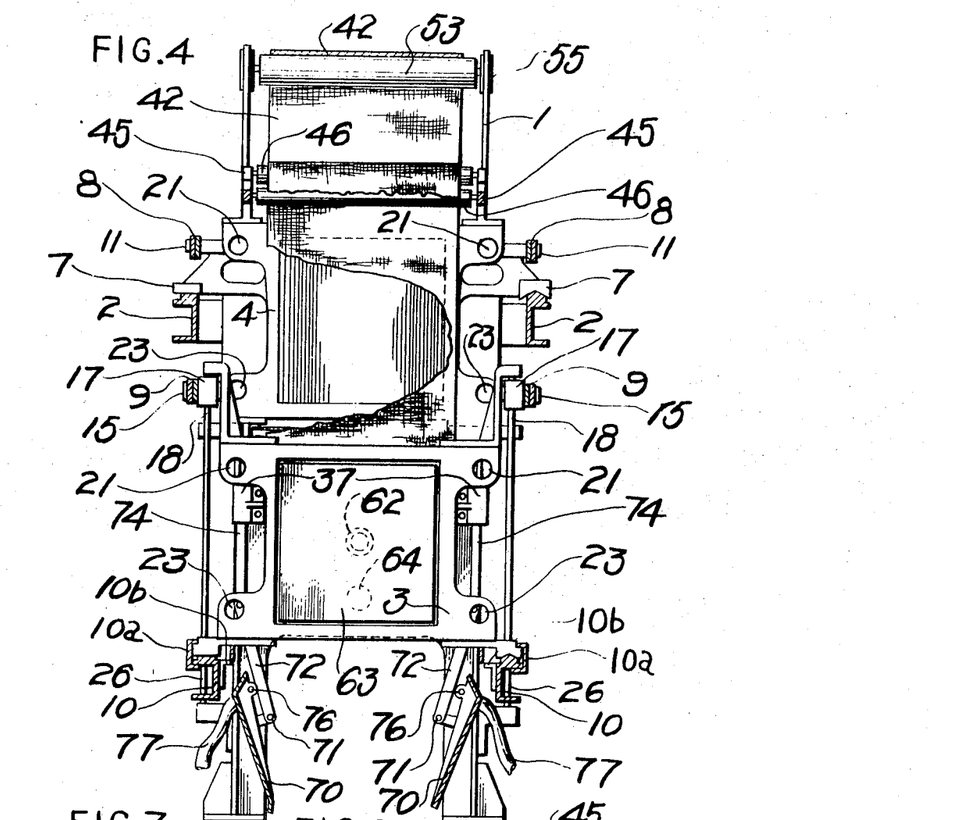
FIG. 4 is a vertical sectional view taken along line 4—4 of FIG. 2.
Figure 5:
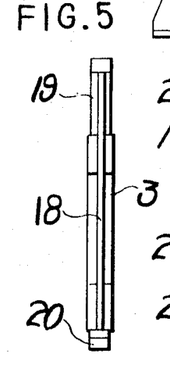
FIG. 5 is a side elevational view of a filter frame.

As shown in FIGS. 3 and 4, each filter frame 3 is connected with the rails 10 at both side ends by means of connecting frames 10$a$ so that said frame 3 is easily taken down by means of aforementioned driving means for rails 10 even if the filter medium 42 adheres to the filter frames 3 or the cakes 43 in said frames, at the end of filtering operation. When the nature of the cakes 43 is such that the tight adhesion to the filter medium 42 permits descent of the filter frames 3 under their own weight, the means for lowering the rails 10 need not include aforementioned chain 36 or the connecting frames 10$a$. In such a case, the driving means for the rails may be such that it functions only to raise the rails 10 and the filter frames 3 may simply rest on the rails 10, and need not be connected thereto.

Each filter plate 4 has supporting surfaces 4$a$ for the filter medium 42 comprising gauge projections, or the like, and also a passage for filtrate leading to the outlet 44 for the filtrate under the supporting surfaces together with an inlet 21 for liquid to be purified or water for washing out the cakes at the upper portion and the outlet 44 for the filtrate or washing out the cakes at the lower portion. Besides them, in the device according to the present invention, the filter plates 4 are provided with rollers near the front and back surfaces of the filter plates 4 for guiding the filter medium 42 in the form of an endless belt. That is, there is provided at the top of each filter plate 4 a T-shaped bracket 45 which differs in height alternatively in the series of the plates 4 and front and back rollers 46 are rotatably mounted on said bracket 45, and there is provided at the bottom of each filter plate 4 a bracket 47 on which a roller 48 is rotatably mounted. An endless filter medium 42 is trained over rollers 46 and 48 so as to cover the front surface and the back surface of each filter plate 4 so that said medium 42 is disposed in the clearances between the filter frames 3 and the filter plates 4.

The remainder of the filter medium 42 is trained or engaged over guide rollers 49, 50, and 56, a driving roller 52 operably connected to an electric motor 51, a tension control roller 55 carried by takeup block 53 and deviation correcting means 57. The takeup block 53 is slidably supported to frame 1 and is connected to weight 54 which provides a constant tension force on the medium 42. In an embodiment of the deviation correcting means shown in the drawings, there are provided four rollers 57$b$ each of which is supported so as to rotate freely relative to each other and which can be rotated about a main shaft 57$a$. The correction of the deviation of the endless filter medium 42 is accomplished by moving one of the rollers 57$b$ being in contact with the medium 42 along the supporting shaft of said roller together with the medium 42 and returning said roller 57$b$ to the original position when said roller 57$b$ leaves the medium 42, as shown, for example, in Japanese Patent publication No. 29934/64. In the separated state of the filter frames 3 and the filter plates 4 with intervals ½$\alpha$ therebetween, the endless filter medium 42 is run in the direction of arrow "A" (counterclockwise) as shown in FIG. 2 by operation of the driving roller 52. A detecting device (not shown) for determining the deviation of the medium 42 is provided, for example, between the roller 56 and the deviation correcting means 57. The deviation correcting means and the detecting device operate similar to those of the embodiment shown in FIGS. 20, 21 and 22 which will be detailed hereinafter.

Along the running path of the filter medium 42, there are provided means for washing and cleaning the medium 42. Said means include nozzles 58 which jet washing water onto the filter medium 42 whereby the medium 42 is washed continuously. Said water is received in a receptacle 59 and is exhausted through a suitable conduit connected to the outlet 60 of the receptacle.

Figure 13:
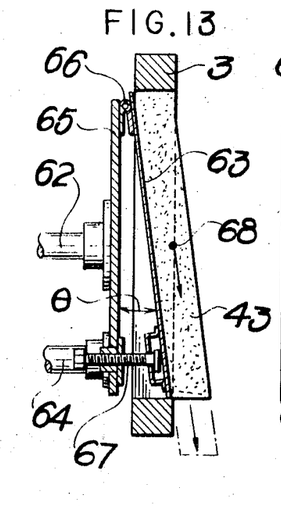
FIG. 13 is a sectional side view of cake-discharging means taken along line 13—13 of FIG. 14 with illustrating cake discharging.
Figure 14:
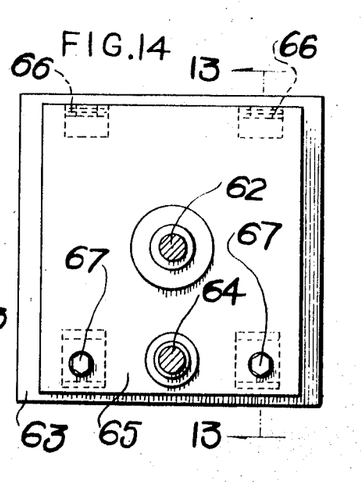
FIG. 14 is a rear elevational view of the cake-discharging means shown in FIG. 13.

Cake-discharging means which removes cakes from the filter frames 3 after filtering operation at the taken-down position of the frames 3 comprise; two hydraulic pistons or motors 61, one of which is positioned at the front and the other at the back of the frame 1; two pushing plate members 63 which are fixed to the free ends of the piston rods 62 of the motors 61; and two rotation preventing rods 64 which are supported slidably along the bars 2 in the frame 1 and prevents the rotation of the plate members 63 so as to hold and maintain the posture of said members. The pushing plate members 63 are advanced and retreated by the motors 61 through the openings of the filter frames 3 whereby cakes choked in said openings of the filter frames are discharged, as illustrated in FIG. 13. In order to prevent the adhesion of the cake discharged from one filter frame 3 to the cake in the opening of the following filter frame 3, as is often the case when the front faces of the plate members 63 are vertical, it is preferred to slope the front faces of the plate members 63 in the manner illustrated. The plate member 63 shown in FIGS. 13 and 14 is pivotally connected at its upper portion with a connecting plate 65, which is then secured to the end of the piston rod 62 by a hinge 66. An adjusting bolt 67 is carried in a screwed bore formed in the plate 65, one end of said bolt supporting the plate member 63 at its lower portion so that the slope thereof can be controlled by advancing or retreating the bolt 67. Owing to the sloped face of the plate member 63, the lower end of the cake 43 is pushed out of said frame 3 first so that the cake 43 tends to slide down along the sloped face of the member 63 whereby the the smooth removement of the cake is accomplished. It is to be understood that the center of gravity 68 of the cake 43 is never brought out of the filter frame 3 before the lower end of said cake 43 so that the adhesion of said cake 43 to the cake in the next filter frame is prevented. The above-mentioned mechanism for cake discharging also permits the required interval between two adjacent filter frames 3 whereby the required space for the entire device may be reduced.

Under the filter frames 3 and filter plates 4, there is provided a device for receiving the filtrate during the filtering operation. Said device comprises a pair of saucerlike members 70 in the form of rectangles pivotally connected to the frame 1 at both front and back ends 69. There are provided in the device means for opening and closing the saucers 70 automatically in connection with the taking down and taking up of the filter frames 3. Said means include a pair of links 72, one end of each being pivotally connected with a member 70 and the other end pivotally connected with the lower end of a vertical rod 74 at 75, see FIG. 3. Said rods 74 are slidably supported to the frame 1 by means of supporting blocks 73. There is provided a hook 76 at the top of each vertical rod 74 which is caught by a projection 10b on the rails 10 whereby said rod 74 is moved upwardly with the raising of the rails 10 and downwardly with the lowering of said rails. Said pair of saucerlike members 70 are, therefore, opened at the taken-down or lowered state of the rails 10 so that said members 70 functions as a chute which opens in a direction away from the underside of the filter frames 3 and filter plates 4. Accordingly, the members 70 are closed at the taken-up or raised state of the rails 10 owing to the upward movement of the rods 74 so that said members 70 are positioned under the filter frames 3 and filter plates 4 and provide a receptacle for the filtrate falling down after permeating through the filter medium 42 pressed between the filter frame and filter plates, as shown in FIGS. 1 and 3. The filtrate received in the saucers 70 is recovered through conduits 77 connected to the saucers.

When filtration is intended, the filter frames 3 and filter plates 4 are assembled in parallel arrangement, the filter medium 42 is pressed between each filter frame 3 and each filter plate 4 adjacent to the frame 3 by operating the fluid motor 24 as shown in FIGS. 1 and 3, and liquid to be purified, namely slurry, is fed into each filter frame 3 through each passage 21. During the filtering operation, the members 70 are closed as stated before. As is usual, filtrate is discharged through the outlet 44 in filter plate 4 into outlet passage 23.

When the filtering operation has been completed, the filter frames 3 and the filter plates 4 are separated between the fixed head 5 and the movable head 6 by pulling backwardly the movable head 6 with the motor or piston 24. During the separating operation of the filter frames 3 and filter plates 4, the driving roller 52 is not engaged with the electromagnetic clutch and is freely rotatable so as not to resist said separation. Then, the piston rod 27 is advanced by operating the hydraulic piston or motor 30 so that the rails 10 are taken down to such extent shown in FIG. 2. In this operation, the filter frames 3 are lowered out of position from between the filter plates 4 in such a manner that the intervals between two adjacent filter frames 3 are maintained constant and the filter frames 3 are maintained in parallel, vertical arrangement. In the taken-down or lowered state of the frames 3, the lower end of each filter frame 3 is disposed in a hollow 40 of the retaining member 41 so as to hold the given arrangement of the frames 3. In this case, the saucerlike members 70 are opened to provide a discharge chute for cakes 43. Then, the pushing plate members 63 are advanced through the openings of the filter plates 3 by means of the pistons or motors 61 so that cakes in said openings are discharged successively out of the frames 3. After the completion of this discharging operation of cakes, the plate members 63 are retreated.

Further, upon lowering of the filter frames 3 the filter medium 42 is advanced in the direction "A," shown in FIG. 2, by rotation of the driving roller 52 with the motor 51, so that the portion of the filter medium 42 which was used for the filtering operation is removed from its operative position in overlying engagement with the filter plates 4. Upon removal, the filter medium 42 is washed with water jetted from the nozzles 58 and cleaned filter medium 42 is brought into operative position with respect to each filter plate 4. This cleaning operation of the filter medium, is effective concurrent with the aforementioned cake-discharging operation.

After cleaning the filter frames 3 and the filter medium 42, the filter frames 3 are raised so that each frame 3 is positioned in each clearance between two adjacent filter plates 4 and the member 70 are closed again, and the movable head 6 is advanced so as to assembly the filter frames 3 and the filter plates 4 so that the filter medium 42 is pressed again between each filter frame 3 and each filter plate 4 for further filtering operation.

During the separating and assembling operations of the filter frames 3 and the filter plates 4, a constant tension is applied to the filter medium 42 by the tension providing roller 55 supported by the taking-up block 53 with the aid of the weight 54. Further, during the assembling operation of the filter frames 3 and the filter plates 4, the driving roller 52 is not engaged with the clutch and is freely rotatable so as not to exert a retarding force on the filter medium 42.

In FIGS. 16 through 19, there is shown another embodiment of the filter press according to the present invention in which there are provided driving means for rotating the guiding rollers 46 for the filter medium 42 at the tops of the filter plates 4, said means being cooperated with the aforementioned driving roller 52. The driving means of this embodiment will facilitate advancement of the long filter medium 42, a problem that may arise when only one driving roller 52 is used in conjunction with numerous sets of filter frames 3 and filter plates 4.

Figure 19:
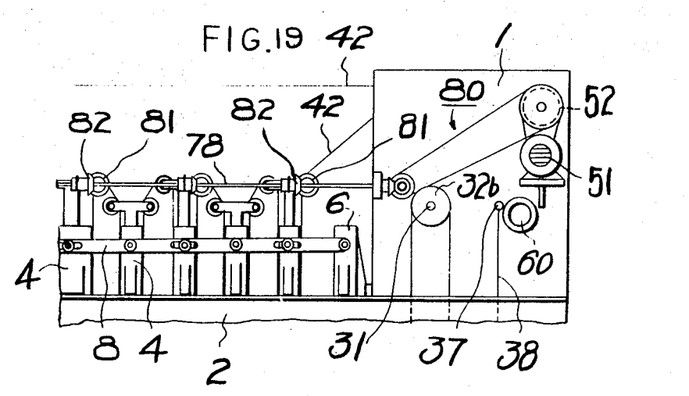
FIG. 19 is a side elevational view, partially cut away, of a part of the filter press having the filter plates shown in FIGS. 16 through 18.

In this improved embodiment, driving means are provided for selected guide rollers in the form of a rotating shaft 78 that is driven by suitable transmitting means 80 engaged with the driving roller 52, which is in turn driven by the motor 51 through the aforementioned electromagnetic clutch (not shown) as illustrated in FIG. 19. The back rollers 46 mounted on the brackets 45 at the tops of optionally chosen filter plates 4 are equipped with bevel gears 81 which are secured to the shafts of the rollers 46. Bevel gears 82 geared with the bevel gears 81 are provided with slider members 83 which are slidably inserted in a groove 79 formed in shaft 78 so that said bevel gears 82 are slidably mounted on the shaft 78 for rotation therewith. Each bevel gear 82 is also provided with annular groove 84 on its boss, with a portion 45a of the bracket 45 engaged in said groove so that the bevel gear 82 is rotatably mounted to said bracket in meshed engagement with the bevel gear 81.

Accordingly, the gears 82 which drive the guiding rollers 46 can be moved along shaft 79 in conjunction with the filter plates 4 so that the rotation of the guiding rollers 46 can be effective at any time. By adjusting the gearing of the drive means employed to interconnect shaft 79 with motor 51 the spherical speed of each guiding roller 46 can be maintained equal to that of the driving roller 52. The guiding rollers 46 are freely rotatable when the filter frames 3 and filter plates 4 are separated or assembled, because said rollers 46 are also connected to the motor 51 through the common electromagnetic clutch for the driving roller 52 through said roller.

Figure 16:
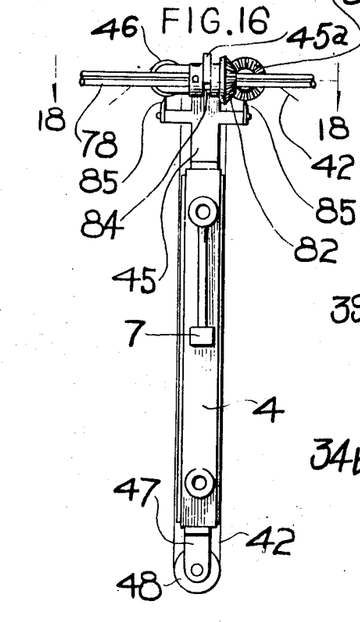
FIG. 16 is a side elevational view of another embodiment of a filter plate according to the present invention.
Figures 17, 18:
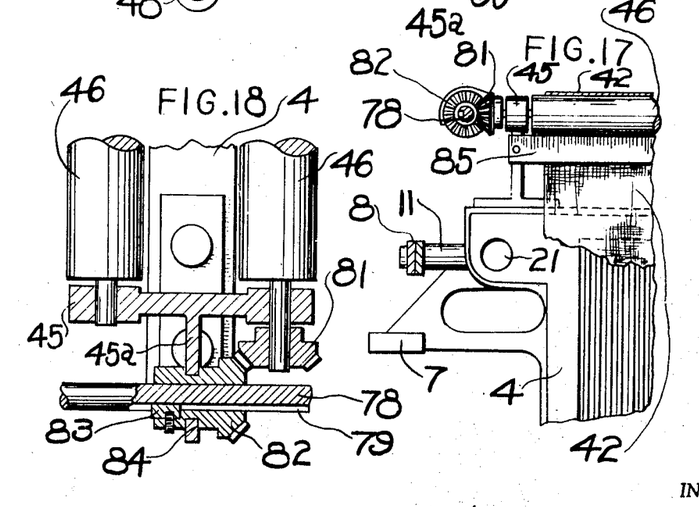
FIG. 17 is a front elevational view, partially cut away, of the filter plate shown in FIG. 16.
FIG. 18 is an enlarged transverse sectional view taken along line 18—18 of FIG. 16.

As clearly shown in FIG. 16, the filter plates 4 are provided with a pair of scraper blades 85 mounted on the brackets 45, the edges of which scrape off cake material that may adhere to the circumferences of the guiding rollers 46 during the running of the filter medium 42.

Figures 20, 21:
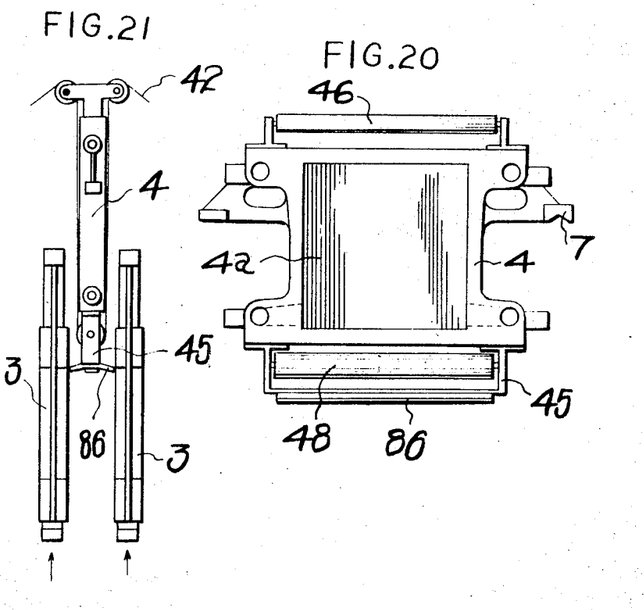
FIG. 20 is a front elevational view of a part of the filter press according to still another embodiment of the present invention in which wiping means for the filter frames are provided.
FIG. 21 is a side elevational view of a part of the filter press illustrating the wiping operation with the wiping means shown in FIG. 20.

In another embodiment of the present invention shown in FIGS. 20 and 21, each filter plate 4 is provided at the lower end with wiping means which clean the front and backfaces of the filter frame 3. Said means comprise scraper blade 86 of a plastic material or the like which is secured to the bracket 47. The scraper blade 86 wipes the backface of one adjacent filter frame 3 and the front face of the other adjacent filter frame 3 when the filter frames 3 are taken up, so that any cake material which may have adhered to said frame 3 subsequent to cleaning is removed prior to the next succeeding filtering operation. The wiping means thus provides a clean, cake-free surface on the frame 3 for engagement with the filter medium 42, whereby any problem due to slurry leaks are avoided.

Figures 22, 23:
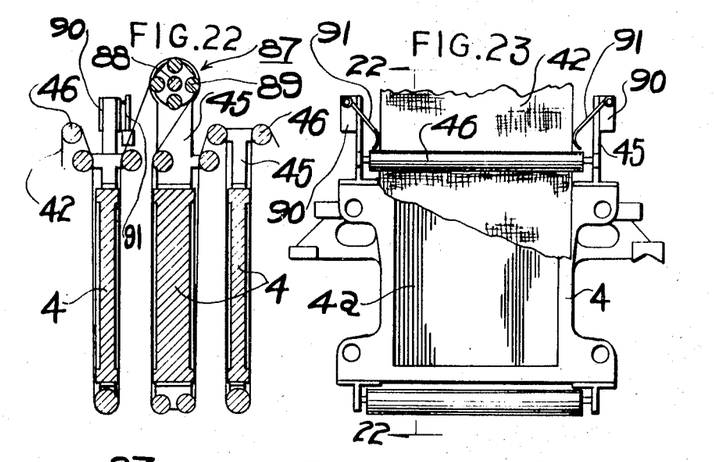
FIG. 22 is a vertical sectional side view of deviation correcting means for the filter medium which is provided to the central filter plate, and taken along line 22—22 of FIG. 24.
FIG. 23 is a front elevational view of a filter plate which is provided with deviation detecting means for the filter medium.
Figure 24:
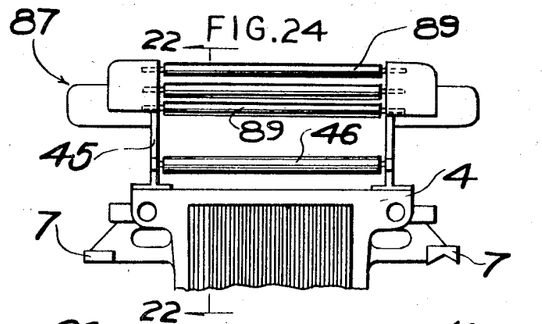
FIG. 24 is a front elevational view of a part of a filter plate which is provided with deviation correcting rollers for the filter medium.

In FIGS. 22, 23 and 24, there are shown deviation correcting means for the filter medium 42 according to a further embodiment of the present invention which means are preferred when the filter press is a larged scaled one with increased numbers of the filter frames 3 and the filter plates 4. The filter medium 42 is in the form of an endless belt which is trained over rollers 46, 49, 50, 52, 53 and 56 and the like in the device according to the present invention so that it is necessary to train the filter medium 42 in an accurate arrangement between each filter frame 3 and filter plate 4 without deviation of said medium 42. The device according to the present invention, therefore, requires at least a set of deviation correcting means as the singular means mentioned above are not sufficient when the device is a large scaled one. The additional deviation correction means 87 for the filter medium 42 according to the present embodiment are equipped on one of the filter plates 4. As said means 87 require somewhat large space, they are equipped on the central filter plate which is somewhat thicker than the other plates 4 for preventing the collision of the pushing plate members 63 coming from forward and backward during the cake discharging operation. Said thicker plate 4 is provided with a pair of lower guiding rollers 48 which is the case with the hereinbefore described embodiments of the invention.

As shown in FIG. 22, the deviation correcting means 87 for the medium 42 mounted on the bracket 45 of the top of the central filter plate 4 comprise four rollers 89 each of which is supported so as to rotate freely on its own axis relative said means 87 and which can orbit about the shaft 88. The correcting of the deviation of the endless filter medium is accomplished in such a manner that one of the rollers 89 being in contact with the medium 42 is moved axially relative to shaft 88 together with the medium 42, said roller 89, being returned to its original position along the shaft 88 when engagement with the medium 42 ceases. One of the adjacent filter plates 4 is provided with deviation detecting means 90 for detecting the deviation of the filter medium 42 which means 90 includes a detecting arm 91 being always in contact with the medium 42. When the detecting means 90 detect the deviation of the filter medium 42 with the arm 91, said means feed a signal to the correcting means 87 so that one of the rollers 89 is moved axially relative to shaft 88 for correcting the deviation of the medium 42 as detailed above.

Figure 25:
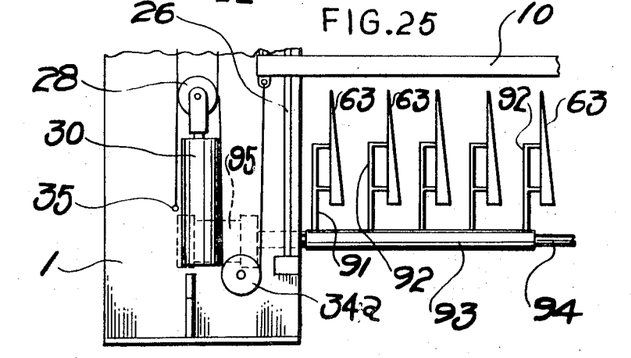
FIG. 25 is a side elevational view of a cake-discharging means according to still another embodiment of the present invention.

FIG. 25 shows another embodiment of cake-discharging means according to the present invention in which a plurality of pushing plate members 63 are employed, corresponding in numbers to the filter frames 3 used. The plate members 63 are arranged along a frame 93 with supporting poles 92 secured to said frame with a definite interval therebetween so that when the filter frames 3 are lowered they will be received in the clearance between the plate members 63. The frame 93 is slidably supported on a horizontal guiding rod 94 so that said frame 93 can be advanced and retreated by a hydraulic piston or motor 95. More than two such frames for supporting the pushing plate members 63 may also be provided. In this embodiment, cakes in the opening of each filter frame 3 are removed with each plate member 63 by advancing the frame 93.

Having now described the invention and having exemplified the manner in which it can be carried into practice, it is apparent to those skilled in the art that innumerable variations, applications, modifications and extensions of the basic principles involved may be made without departing from the spirit of the present invention. The invention is, therefore, to be limited only by the scope of the appended claims.

What is claimed is:

1. A filter press comprising alternately arranged filter frames and filter plates, said filter frames having passages for slurry to be filtered and said filter plates having outlet passages for filtrate; connecting means coupling said frames and plates for selective separation of said frames and plates with predetermined intervals therebetween longitudinally of the press; drive means for separating and converging said frames and plates; means for withdrawing said frames from between said plates; a filter medium including an endless belt trained over the faces of each of said plates; guide means for said belt; belt drive means for transporting said belt when the frames have been withdrawn from between the plates; cake-discharging means including a pair of pusher members and drive means for advancing said pusher members from the ends of the press toward the center thereof and for retracting said pusher members whereby to remove filter cakes from the withdrawn filter frames.

2. A filter press according to claim 1 wherein there is a corresponding number of pusher members and filter frames.

3. A filter press according to claim 1 wherein said endless medium is trained over a pair of guiding rollers mounted on the top of each filter plate and a single guiding roller mounted on the bottom of each filter plate so as to cover both faces of each filter plate.

4. A filter press according to claim 1 wherein each filter plate is provided at the lower end with wiping means affixed to said plate to move therewith to scrape off cake material from the faces of each filter frame during the raising of said frame.

5. A filter press according to claim 1 wherein said connecting means for the filter frames and filter plates comprise upper links and lower links and the filter frames are connected only with said lower links through guiding bars extended outwardly from the both sides of the frames in such a manner that the filter frames can be raised and lowered.

6. A filter press according to claim 1 wherein said means for withdrawing the filter frames comprise a pair of spaced horizontal rails, and means for raising and lowering said rails, the lower end of each filter frame being engaged with the rails so as to slide along said rails.

7. A filter press according to claim 6 wherein the lower end of each said filter frame is slidably connected to said rails.

8. A filter press according to claim 1 wherein there is provided below the filter frames and filter plates a receptacle for filtrate comprising a pair of pivotally mounted members, and means for pivoting said members from a closed position to an open position to provide a chute for discharge of said cakes.

9. A filter press according to claim 1 wherein there is provided a retaining member having hollows with which the lower ends of the filter frames are received when said frames are lowered so as to maintain the parallel spacing of the frames.

* * * * *